UNITED STATES PATENT OFFICE.

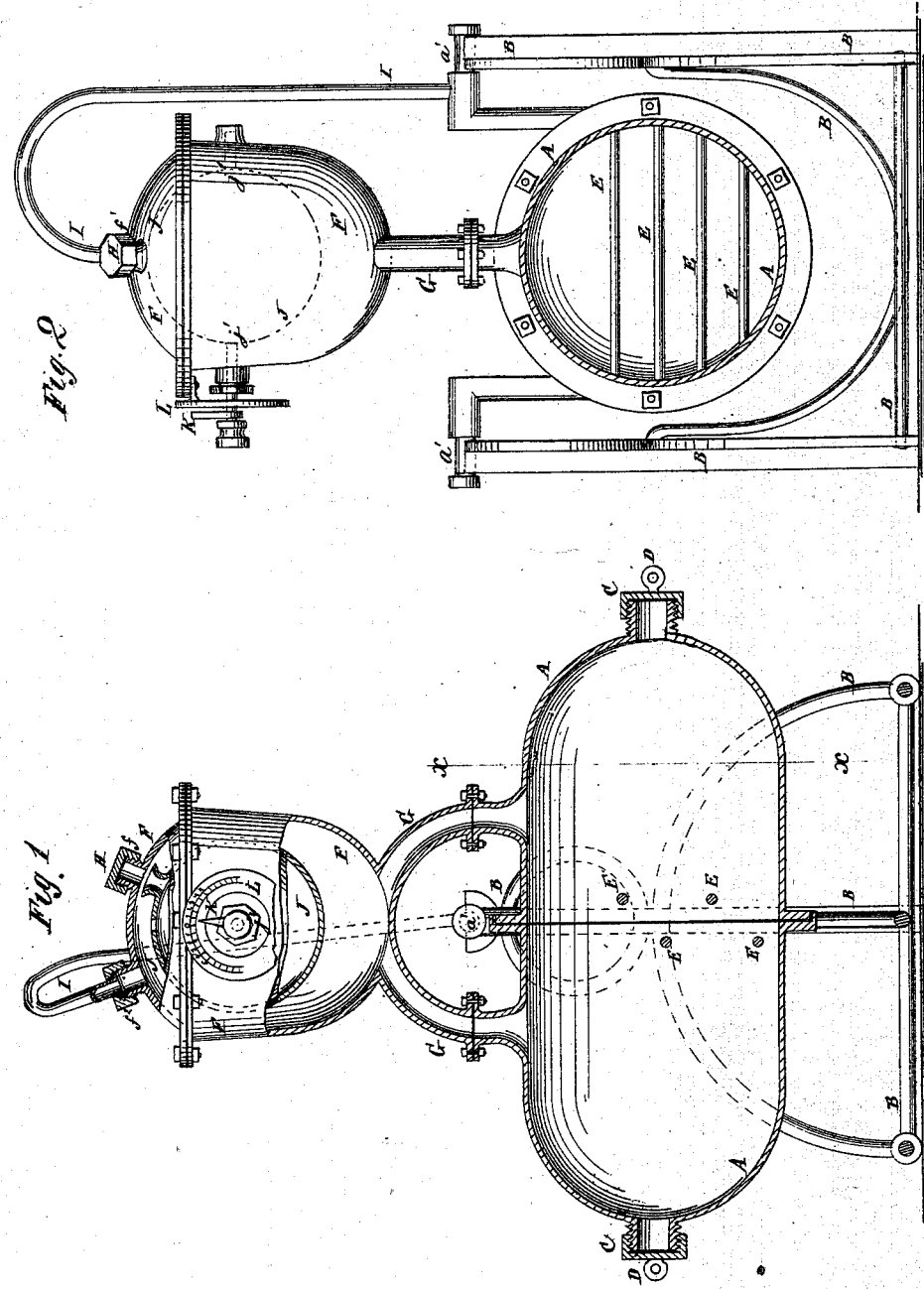

FRIEDERICK W. WIESEBROCK, OF NEW YORK, N. Y.

IMPROVEMENT IN CARBONIC-ACID-GAS GENERATORS.

Specification forming part of Letters Patent No. 144,719, dated November 18, 1873; application filed October 11, 1873.

*To all whom it may concern:*

Be it known that I, FRIEDERICK W. WIESEBROCK, of the city, county, and State of New York, have invented a new and useful Improvement in Carbonic-Acid-Gas Generator, of which the following is a specification:

Figure 1 is a side view, partly in section, of my improved generator. Fig. 2 is an end view of the same, partly in section, through the line $x$ $x$, Fig. 1.

Similar letters of reference indicate corresponding parts.

My invention has for its object to furnish improved apparatus for generating carbonic-acid gas for charging soda-fountains, and for other uses, which shall be so constructed that the operator can discharge any desired amount of acid into the generator, as may be required, and know exactly how much remains in the acid-chamber, and which can be operated without an agitator.

The invention will first be fully described and then pointed out in claims.

A is the generator, which is made of the ordinary form, of any desired size, and of any suitable material. To the sides of the generator A are attached gudgeons $a'$, which rise above the said generator to suspend it, and which work in bearings in the upper part of the frame-work B. In the ends of the generator A are formed openings, through which the charge is inserted and the refuse removed. These openings are closed by screw-caps C, upon which are formed handles D, for convenience in oscillating the generator, to bring all parts of the marble-dust in contact with the acid. To facilitate and insure the thorough intermingling of the acid and marble-dust, cross-bars E are extended across the middle part of the generator A, and have their ends secured to the shell of the said generator. F is the dome or gas-chest, which is connected with the generator by one or more pipes, G. In the top or cover of the dome F are formed two openings, $f^1$ $f^2$. The opening $f^1$ is closed with a screw-cap, H, and with the other opening, $f^2$, is connected the end of a pipe, I, which leads down at one side of the dome F, and passes through or is connected with the hollow gudgeon $a'$ of the receiver A, so that the said pipe I may conduct the gas to the washer without being disturbed by the oscillation of the generator A. J is the acid-chamber, which has gudgeons $j'$ formed upon its sides, which work in bearings in the sides of the dome F. One of the gudgeons $j'$ projects, and to it is attached an inex-finger, K, which moves along an index-plate, L, attached to the side of the dome F, and thus indicates the exact amount of acid that is poured out of said chamber J. In the upper side of the acid-chamber J is formed a hole with a funnel-shaped mouth, which, when the generator stands at rest in a horizontal position is directly beneath the opening $f^1$, as shown in Fig. 1, so that the acid poured in through the said opening $f^1$, may flow into the acid-chamber J. In the upper side of the acid-chamber J, and near the main opening, is formed a small vent-hole, as shown in Fig. 1, to facilitate the operation of filling and emptying the said acid-chamber J.

By this construction, the contents of the generator A will be thoroughly intermingled, by simply oscillating the said generator, which movement does not effect the acid-chamber, which swings upon its pivots and is kept right-side up by gravity.

The acid-chamber J is turned to pour out the acid, by means of a knob or hand-wheel attached to the projecting end of the gudgeon of said acid-chamber.

This construction enables the generator to be turned into a vertical position, so that the refuse can be readily discharged without its being necessary to retain sufficient gas in the generator to blow out the said refuse, as is the case with the ordinary apparatus, thus effecting a great saving of gas.

Having thus described my invention, I claim as new and desire to secure by Letters Patent—

1. The arrangement of the gas-pipe I in connection with the dome F and hollow journal or gudgeon of the oscillating generator A, substantially as herein shown and described.

2. The combination of cross-bars E with the oscillating gas-generator A, substantially as herein shown and described.

FRIEDERICK W. WIESEBROCK.

Witnesses:
JAMES T. GRAHAM,
T. B. MOSHER.